June 14, 1938.  B. ADKINS  2,120,848
SYSTEM OF ELECTRIC MOTOR CONTROL
Filed July 28, 1937
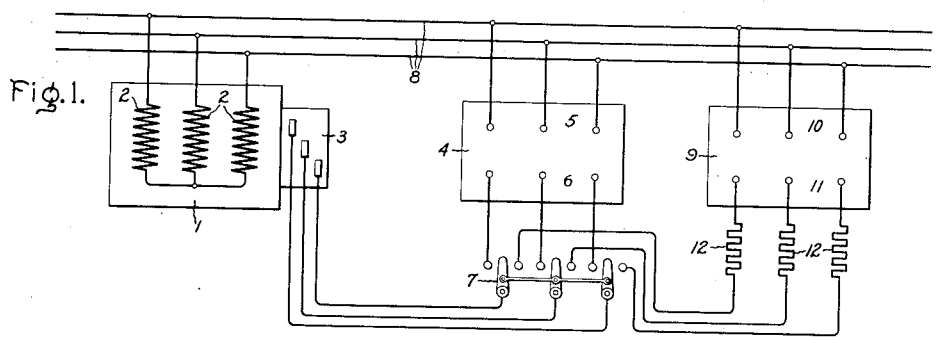
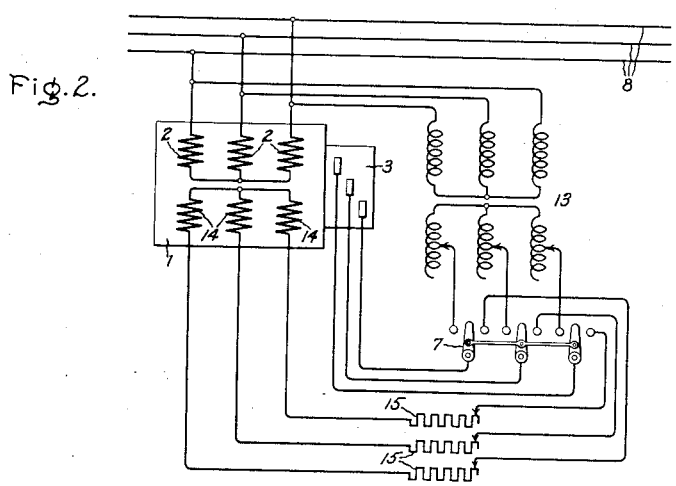
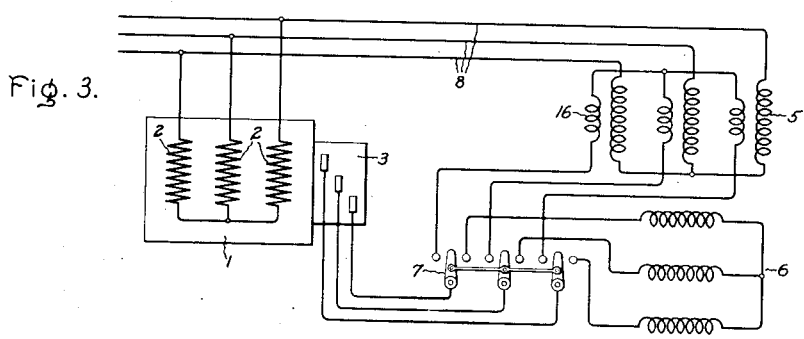
Inventor:
Bernard Adkins,
by Harry E. Dunham
His Attorney.

Patented June 14, 1938

2,120,848

UNITED STATES PATENT OFFICE 2,120,848

SYSTEM OF ELECTRIC MOTOR CONTROL

Bernard Adkins, Rugby, England, assignor to General Electric Company, a corporation of New York Application July 28, 1937, Serial No. 156,165
In Great Britain November 4, 1936

4 Claims. (Cl. 172—280)

This invention relates to systems of electric motor control and more particularly to systems in which the speed of the motor is varied.

The shunt polyphase commutator motor with an induction regulator, a transformer, or an auxiliary stator winding connected to the commutator provides a convenient variable speed drive for many applications. My invention consists in providing a simple and rapid method of bringing a motor of this type to rest from any speed.

According to the present invention, the commutator of the motor is disconnected from the regulator, transformer or auxiliary stator winding, and connected to the secondary of a separate three-phase transformer. The voltage supplied by this transformer is approximately equal to the motor armature voltage at standstill, and it is connected so that the voltages oppose at standstill, so that no current or only a small current will flow. When the armature rotates, the induced voltage is reduced and the resultant voltage will cause a current to flow so as to produce a braking torque.

The torque speed characteristic obtained would be approximately parallel to those obtained during normal speed, and would pass approximately through the point representing zero torque at zero speed. At high speeds a very strong braking action would be obtained. If the braking torque is too great for the application in question, it can be reduced by inserting in series with the transformer a three-phase resistance, reactance or condenser. By varying the voltage of the transformer, the motor may be brought down to a predetermined low speed instead of to standstill.

The accompanying diagram, Figs. 1, 2, and 3, shows typical connections for carrying out this method of braking. In the diagram, Fig. 1, 1 is a shunt commutator motor, and 4 is a regulator used for controlling its speed. The primary windings 2 and 5 of motor and regulator respectively are connected to the alternating current supply 8 and the commutator 3 of the motor and the secondary windings of the regulator are connected together through the changeover switch 7. By changing over switch 7, the commutator of the motor can be connected to the secondary 11 of the transformer 9, the primary 10 of which is connected to the alternating current supply 8. In series with the secondary 11 of the transformer is an impedance 12. Reactance may also be introduced in this circuit by building the transformer 9 so as to have a high reactance.

In Fig. 2, the normal speed-regulating apparatus comprises an adjustable transformer 13 and the braking voltage is obtained from an auxiliary winding 14 on the stator of the shunt commutator motor. The impedance 15 in the braking circuit may be adjustable.

In Fig. 3, the induction regulator is provided with an auxiliary stationary winding 16 used only for braking purposes. When operating under normal conditions, the commutator 3 is connected by switch 7 to the winding 6 on the rotatable part of the induction regulator and, for braking purposes, the switch 7 is thrown to connect the commutator to the auxiliary winding 16. The primary winding 5 of the induction regulator thus serves the double purpose of providing the regulating and the braking voltage for the motor.

What I claim as new and desire to secure by Letters Patent of the United States is:

1. In combination, a shunt polyphase commutator motor having a stator primary winding and a rotor winding, a commutator connected to said rotor winding, a polyphase system of brushes bearing on the commutator, a polyphase source of supply for said primary winding, means energized from said source for supplying a polyphase speed-regulating voltage for said motor, means energized from said source for supplying a polyphase braking voltage for said motor, and means for alternately connecting said brushes to said two polyphase voltage supplying means.

2. A shunt polyphase commutator motor having a stator primary winding and a rotor winding, a commutator to which said rotor winding is connected, a polyphase set of brushes bearing on said commutator, a source of polyphase supply for said motor, polyphase voltage transforming means supplied from said source for providing a regulating voltage for said motor, an auxiliary stator winding on said motor for supplying a polyphase braking voltage for said motor, and switching means for connecting said brushes to said voltage transforming means or to said auxiliary winding.

3. In combination, a shunt polyphase commutator motor having a primary stator winding and a rotor winding, a commutator connected to said rotor winding, a polyphase set of brushes bearing on said commutator, a polyphase source of supply for said motor, polyphase voltage transforming means for producing a voltage equal to the voltage of said commutator brushes when the motor is energized at standstill, and means for connecting said voltage-transforming means to said brushes so that their voltages oppose for the purpose of braking said motor and impedance included in said connecting means for varying the braking voltage supplied to said commutator brushes by said voltage-transforming means.

4. In combination, a polyphase shunt commutator motor having a stator winding and a rotor winding, a commutator to which said rotor winding is connected, polyphase brushes bearing on said commutator, a polyphase source of supply for said motor, voltage-transforming means having a primary winding energized from said source and two secondary windings, one secondary winding producing a speed-regulating voltage for said motor and the other a braking voltage for said motor, and switching means for connecting said brushes to either of said secondary windings.

BERNARD ADKINS.